Figure 1:
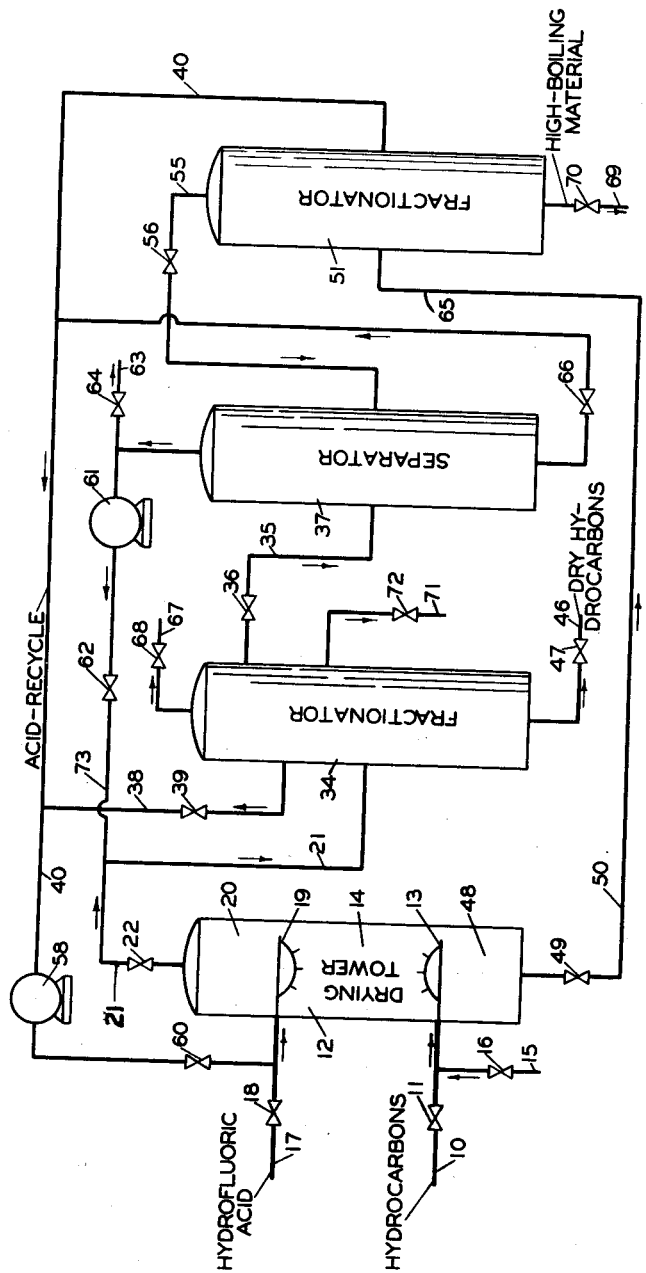

Nov. 27, 1945.　　　　F. E. FREY　　　　2,389,971
TREATMENT OF SATURATED HYDROCARBON MATERIALS
Filed Feb. 10, 1942　　　2 Sheets-Sheet 1

INVENTOR
FREDERICK E. FREY
BY Hudson, Young & Yinger
ATTORNEY

Patented Nov. 27, 1945

2,389,971

UNITED STATES PATENT OFFICE 2,389,971

TREATMENT OF SATURATED HYDROCARBON MATERIALS

Frederick E. Frey, Bartlesville, Okla., assignor to Phillips Petroleum Company, a corporation of Delaware Application February 10, 1942, Serial No. 430,293

6 Claims. (Cl. 260—683.4)

This invention relates to the treatment of substantially saturated hydrocarbon materials with hydrofluoric acid. More particularly my invention relates to the removal of water from said hydrocarbon materials by treatment with hydrofluoric acid, and still more particularly to the drying of saturated hydrocarbons used in hydrocarbon conversions promoted by catalysts comprising hydrofluoric acid.

It is well known that commercially available hydrocarbon materials normally contain small concentrations of water, which is present as vapor in gaseous hydrocarbon materials or as dissolved water or water held in loose chemical or physical combination in liquefied or liquid hydrocarbon materials.

For many of the uses to which hydrocarbons are put, water even in small concentrations is objectionable. For example, in hydrocarbon-conversion processes using hydrofluoric acid as a catalyst, water is generally objectionable for at least three reasons; namely, (1) it increases the corrosion of metallic processing equipment by the hydrofluoric acid, (2) it decreases the catalytic activity of the hydrofluoric acid, and (3) it decreases the yield and the quality of the hydrocarbon-conversion product.

One object of my invention is to remove water from substantially saturated hydrocarbon materials.

Another object of my invention is to treat hydrocarbons in such a manner that subsequent conversion of said hydrocarbons in the presence of hydrofluoric acid is enhanced.

A more particular object of my invention is to improve the catalytic alkylation of hydrocarbons by removing water which may be present in the hydrocarbons to be alkylated.

Other features and objects of the invention will be apparent from the accompanying description and discussion.

I have found that substantially anhydrous, liquid hydrofluoric acid is a very efficacious dehydrating or drying agent for the removal of water from substantially saturated hydrocarbon materials. More particularly I have found that hydrocarbon materials comprising for the most part saturated hydrocarbons together with small percentages of water, which may be free, or dissolved, or held in loose chemical or physical combination with the hydrocarbon material, can be dried advantageously and without appreciable loss through chemical reactions by contacting with concentrated hydrofluoric acid in amount at least sufficient to form a separate liquid phase in which hydrogen fluoride is the component present in the largest proportion. Hydrofluoric acid used for this drying operation may be recovered from the separated hydrofluoric acid phase by fractional distillation and may be recycled to the dehydrating step. The drying operation of this invention is particularly advantageous when used in combination with certain catalytic hydrocarbon-conversion processes in which a catalyst comprising hydrofluoric acid is employed; in such combination processes, a step, otherwise ordinarily required for the removal of dissolved hydrofluoric acid remaining in the hydrocarbon material after the drying operation, is advantageously eliminated; also, a single acid-recovery system may be used advantageously for treating spent acids from both the drying operation and the catalytic hydrocarbon-conversion operation.

An understanding of the invention may be aided by the accompanying drawing, in which Figure 1 is a schematic flow-diagram of one arrangement for practicing the invention.

Figure 2:
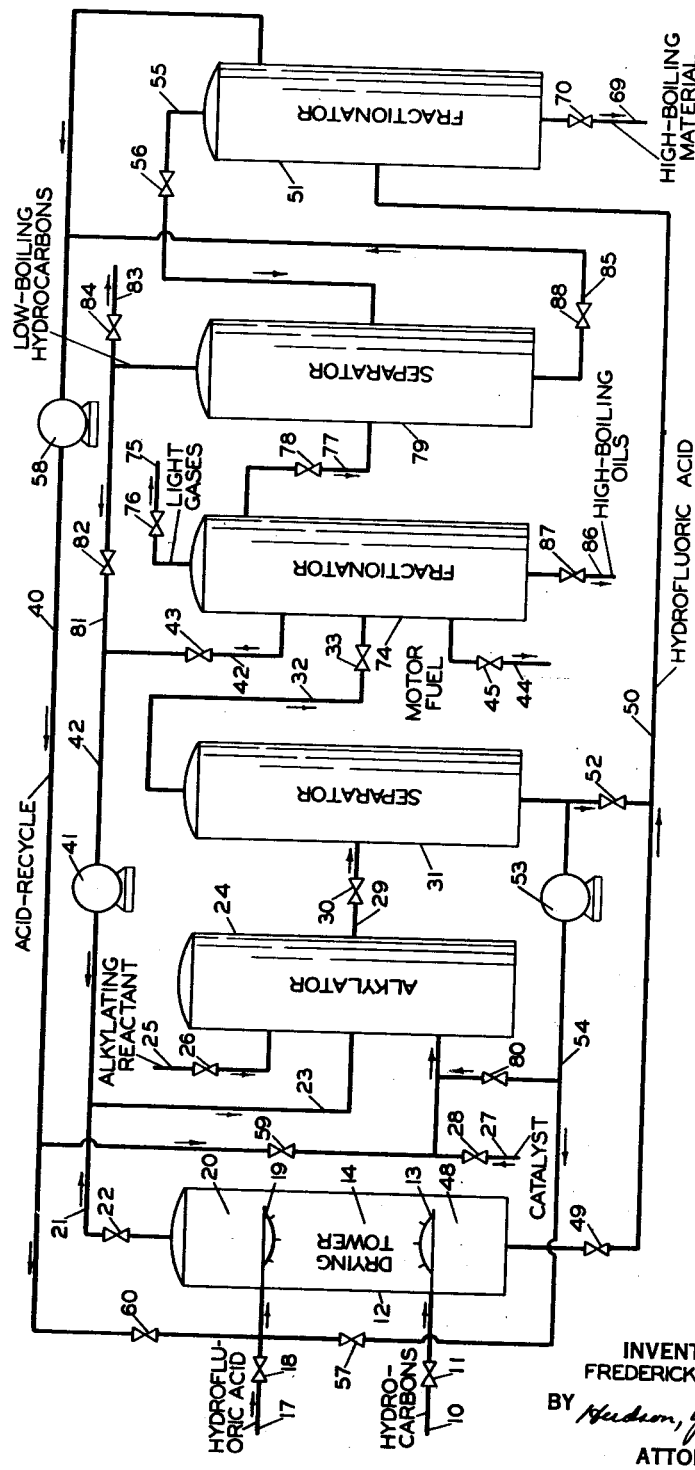

Figure 2 is a schematic flow-diagram of a preferred arrangement for practicing the invention in connection with the hydrofluoric acid alkylation of hydrocarbons. Pieces of equipment which are the same in the two figures are designated by the same reference numerals.

Referring now to Figure 1, the hydrocarbon material to be treated is introduced through inlet 10 controlled by valve 11 into drying tower 12, in which said hydrocarbon material is distributed by suitable means 13 near the bottom of middle section 14 of tower 12. When the raw hydrocarbon material is a low-boiling normally liquid hydrocarbon, it is in some instances desirable, in order to facilitate subsequent removal of residual or dissolved hydrogen fluoride from the hydrocarbon material, to introduce a small proportion of lower-boiling hydrocarbon material through inlet 15 controlled by valve 16; such lower-boiling material may be a relatively lower-boiling normally liquid hydrocarbon such as pentane, or it may be a normally gaseous and readily condensable hydrocarbon such as butane or propane. The hydrocarbon material, because of its relatively low density, rises through section 14 of tower 12 countercurrently to liquid concentrated hydrofluoric acid that is introduced, preferably in an amount of at least a tenth of the volume of hydrocarbon material being treated, through inlet 17 controlled by valve 18 and through distributing means 19, downwardly into the top of section 14. To increase the efficiency of contacting of hydrocarbon material with hydrofluoric acid, section 14 is preferably packed with an inert solid material, such as coke, graphite rings, or the like.

Acid introduced into drying tower 12 should preferably be as nearly pure anhydrous hydrogen fluoride as possible. However, some impurities ordinarily can be tolerated; those most frequently present are water, sulfur dioxide, sulfuric acid, and fluosilicic acid; occasionally, relatively small amounts of dissolved hydrocarbons, alkyl fluorides, and other organic material may be present. In general, acid containing less than about ten per cent of impurities may be used and the terms "concentrated" or "substantially anhydrous" as used herein refer to a composition comprising from about ninety to one hundred per cent by weight of pure anhydrous hydrogen fluoride.

At the top of tower 12, separating space 20 is provided for separation of the resulting dried hydrocarbon phase from the mixture. The hydrocarbon phase passes through conduit 21 controlled by valve 22 to fractionating means illustrated by fractionator 34, wherein it is separated into at least two of the following fractions: (1) a relatively low-boiling fraction that is formed only when the hydrocarbon phase contains one or more light hydrocarbons, such a fraction comprises an azeotropic mixture of hydrogen fluoride and a light hydrocarbon such as propane, butane, or pentane, and subsequently passes through conduit 35 controlled by valve 36 to separator 37; (2) a fraction of substantially pure hydrogen fluoride that is present only when the quantity of low-boiling hydrocarbon is insufficient to carry overhead all the hydrogen fluoride as an azeotropic mixture, such a pure acid fraction is subsequently passed through conduit 38 controlled by valve 39 to acid-recycle conduit 40; (3) a fraction that is present only in the absence of hydrofluoric acid, that comprises any excess of a low-boiling hydrocarbon optionally added through inlet conduit 15 as previously described, and that is withdrawn through outlet conduit 71 having valve 72; and (4) a comparatively large bottom fraction that consists of the desired water-free, acid-free hydrocarbon product, and that is withdrawn through outlet conduit 46 having valve 47. Low-boiling hydrocarbon material removed through conduit 71 may be returned by means not shown in the drawings to conduit 15 and thence to drying tower 12 in admixture with higher boiling hydrocarbons charged through conduit 10. An outlet 67 having valve 68, located at the top of fractionator 34, may be provided to bleed off noncondensable gases which otherwise might accumulate in the system.

Concentrated hydrofluoric acid descending in drying tower 12 passes from section 14 to space 48, wherein separation of the acid from the mixture is effected; said acid then passes through valve 49 and conduit 50 to fractionating means 51, in which it is separated into three fractions: (1) a relatively low-boiling azeotropic mixture of acid and dissolved or entrained light hydrocarbons, which subsequently passes through conduit 55 having valve 56 to separator 37; (2) a substantially pure anhydrous hydrogen fluoride fraction, which is returned by pump 58 and/or gravity through acid-recycle conduit 40 controlled by valve 60 to the hydrofluoric acid inlet 17 to drying tower 12; and (3) a bottom fraction, which is withdrawn through outlet conduit 69 having valve 70, comprising high-boiling acid-soluble material, or sludge, and a constant-boiling mixture of water and hydrogen fluoride.

If desired, hydrofluoric acid may be recovered from the constant-boiling mixture in this bottom fraction by any one of several means, such as alternately distilling at high and low pressures, or electrolyzing away the water and decanting, or distilling the hydrogen fluoride from the resulting concentrated mixture.

In separator 37 mixtures of hydrocarbons and hydrogen fluoride from fractionators 34 and 51 are condensed and are separated into two layers: (1) a hydrocarbon layer which either is forced by pump 61 through conduit 73 controlled by valve 62 and through conduit 21 back to fractionator 34, or is withdrawn through outlet 63 having valve 64, preferably the former; (2) a hydrofluoric acid layer which is passed to acid-recycle conduit 40 through conduit 65 controlled by valve 66. As the mutual solubility of hydrofluoric acid and hydrocarbons decreases with decrease in temperature, separator 37 is preferably cooled to a temperature in the range of from 10 to 50° F., and the pressure should be sufficient to maintain a liquid phase.

Referring now to Figure 2, in which parts corresponding to those in Figure 1 have corresponding numerals, substantially saturated hydrocarbon material to be treated is introduced through inlet 10 controlled by valve 11 into drying tower 12, in which it is distributed by suitable means 13 at the bottom of section 14, which is preferably a packed section. Such hydrocarbon material, because of its relatively low density, rises through the tower countercurrently to liquid hydrofluoric acid that is introduced through inlet 17 controlled by valve 18 and which passes through distributing means 19, downwardly into the top of section 14 of tower 12. At the top of tower 12, separating space 20 is provided for separation of the resulting dried hydrocarbon phase from the mixture.

The resulting dried hydrocarbon material, which contains some dissolved hydrogen fluoride, is passed from separating space 20 through conduit 21 controlled by valve 22 and through conduit 23 to alkylating unit 24. In this unit, it is reacted with an alkylating reactant, introduced through inlet 25 controlled by valve 26, in the presence of a catalyst comprising hydrofluoric acid, introduced through inlet 27 controlled by valve 28.

The reaction conditions in alkylator 24 may vary somewhat with the hydrocarbon being alkylated, with the alkylating reactant used, and with the proportion and the purity of the hydrofluoric acid used as the catalyst; suitable conditions may be readily found by trial for any particular case. The hydrocarbon material to be alkylated preferably is an isoparaffin of four to six carbon atoms per molecule, although it is within the scope of my invention to alkylate normal paraffins of similar molecular weight; the alkylating reactant preferably is an olefin having at least three carbon atoms per molecule, or a polar alkyl compound, such as a halide, alcohol, ester, ether, or the like, having at least one nonprimary alkyl group, preferably tertiary. The ratio of hydrofluoric acid to hydrocarbons is as high as is convenient to establish; preferably it is in the range of 1:1 to 1:10 by liquid volume, but it may be outside of this range without producing markedly inferior results. Because of the preliminary drying effected in tower 12, the concentration of the hydrogen fluoride used as catalyst in alkylator 24 is maintained at the optimum, as it is not reduced by any water present in the initial hydrocarbon being alkylated. The preferred temperature is usually in the range of 50 to 140° F., but temperatures outside of this range may be employed satisfactorily. Since the reactions are exothermic, simple cooling apparatus sometimes may be advantageously incorporated in the reactor. The pressure should be high enough to maintain the reactants in the liquid state; when desired, a higher pressure may be used. The reaction time may vary, in general, from a few seconds to more than an hour; the optimum reaction time for any particular case may be readily selected by trial. To minimize side reactions, the acid and the material to be alkylated should be thoroughly mixed by suitable agitating means, especially during the addition of the alkylating reactant. The instantaneous molar ratio of material to be alkylated to alkylating reactant should be not less than about 10:1 in the zone of introduction of the alkylating reactant; a ratio above about 100:1 is advantageous if an especially high-quality product is desired; accordingly, multipoint addition of the alkylating reactant to the reaction zone, as described, for example, in Frey 2,002,394, is highly advantageous. The reaction mixture preferably should be continuously agitated to maintain intimate contact of the reactants with the catalyst during the entire reaction period.

In general, the effect of a change in any one of the operating conditions or variables may be partly or wholly compensated for by a change in one or more of the other variables.

The effluent from alkylator 24 comprises some unreacted hydrocarbons, relatively high-boiling hydrocarbons formed by the alkylation reaction, hydrofluoric acid, and minor proportions of such by-products as polymers and some fluorine-containing substances. It passes through conduit 29 having valve 30 to separator 31, wherein it is separated, as by cooling and/or gravitational or centrifugal means, into two layers, a hydrocarbon layer and a hydrofluoric acid layer. The upper or hydrocarbon layer passes from separator 31 through conduit 32 and valve 33 to fractionator 74, wherein it is separated into the following fractions: (1) a relatively negligible fraction, sometimes entirely absent, that comprises principally difficultly condensable or gaseous hydrocarbons of less than three carbon atoms per molecule and that is withdrawn through outlet 75 having valve 76; (2) a minor fraction comprising unreacted alkylatable hydrocarbons and dissolved hydrogen fluoride, which is passed as a low-boiling or azetropic mixture through conduit 77 having valve 78 into separator 79; (3) a substantially acid-free fraction comprising chiefly unreacted hydrocarbons, which is recycled to alkylator 24 by pump 41 through conduit 42 controlled by valve 43 and through conduit 23; (4) a fraction comprising hydrocarbon material boiling in the gasoline range and suitable for use as motor fuel, which is withdrawn through outlet 44 having valve 45; and (5) a fraction comprising relatively high-boiling hydrocarbons, polymers, and oils, which is withdrawn through outlet 86 having valve 87.

Suitable steps for recovering acid from my process are embodied in the following discussion.

Downflowing acid in tower 12 separates from the mixture in settling space 48 passes through valve 49 and conduit 50 to fractionating means 51. A part of the lower or acid layer from separator 31 also is usually passed through valve 52 and conduit 50 to fractionator 51; but most of this layer is forced by pump 53 and/or gravity through recycle line 54 to drying tower 12 and/or alkylator 24 in proportions controlled by valves 57 and 80, respectively. The proportioning of the acid from separator 31 among these three unit depends upon the content of impurities present in the acid, and is adjusted in accordance with the specific operating conditions and the specifications for the desired product in any particular case.

The material passed to fractionator 51 is separated into three fractions: (1) a low-boiling azetropic mixture of hydrogen fluoride and dissolved light hydrocarbons, which is passed through conduit 55 having valve 56 to separator 79; (2) a relatively large fraction of substantially pure anhydrous hydrofluoric acid, which is forced by pump 58 and/or gravity through acid-recycle conduit 40 into drying tower 12 and/or alkylation unit 24 in proportions controlled by valves 60 and 59, respectively; and (3) a bottom fraction comprising high-boiling acid-soluble material and a constant-boiling mixture of water and hydrogen fluoride, which is withdrawn through outlet 69 having valve 70. If desired, hydrogen fluoride in this constant-boiling mixture, which may be readily separated mechanically from the other material, may be recovered by any one of several means, such as distilling alternately at high and low pressures, or electrolyzing away the water and separating the acid from the resulting concentrated mixture by distillation. Separator 79 divides the low-boiling mixtures from fractionators 74 and 51 into two layers, as by cooling and gravitational or centrifugal means: one, comprising low-boiling hydrocarbons, which is preferably recycled through conduit 81 controlled by valve 82 and through conduits 42 and 23 to alkylator 24, or, if desired, is withdrawn through outlet 83 controlled by valve 84 to storage or to other processing steps, not shown; and another layer, comprising chiefly hydrofluoric acid, which is passed through conduit 85 having valve 88 to acid-recycle conduit 40.

It will be understood that in the foregoing description and the accompanying drawings, the specific terms used and the specific devices depicted are employed broadly and not necessarily limitatively. For example, the term "fractionator" and "fractionating means" may include any system that is capable of effecting the results indicated; accordingly, it may comprise several columns, cooling and condensing means, pumps, and other appropriate auxiliary equipment. Similarly, the terms "drying tower," "separator," and "alkylator," or variations thereof, are to be understood to include any device or combination of devices that is capable of effecting the results indicated.

For the purpose of illustrating some aspects of the practice of my invention, without unduly limiting the invention, the following examples are given.

*Example I*

To remove water from a batch of normal heptane, said heptane-water mixture may be charged into a steel mixing chamber, and about twenty per cent by weight of liquid anhydrous hydrofluoric acid is added. The mixture is agitated for a short period that need not exceed about five minutes. The temperature may be maintained at about 65° F. by passing cold water through coils in the mixing chamber, but cooling is ordinarily not necessary. The mixture is then passed to a settling chamber, from which, after about ten minutes, two liquid phases are removed. The upper or hydrocarbon layer is charged to a still and is fractionally distilled; substantially pure hydrogen fluoride is withdrawn overhead, and normal heptane completely free of both water and hydrogen fluoride is withdrawn from the kettle. The lower or acid phase from the settling chamber also is charged to a still and is fractionally distilled; anhydrous hydrogen fluoride is withdrawn overhead and is subsequently reused, and a smaller amount of a constant-boiling mixture of hydrogen fluoride and water, together with some hydrocarbon material, is withdrawn from the kettle.

*Example II*

It is desired to synthesize an aviation-grade motor fuel by alkylating commercial-grade isobutane with a fraction of refinery gases comprising about fifty per cent butenes; as the isobutane contains dissolved water, preliminary drying of it is desirable. Accordingly, said isobutane is contacted in liquid phase at about 50° F. and about 100 lbs. per sq. in. gauge pressure, with substantially anhydrous liquid hydrogen fluoride, in a drying tower similar to that illustrated in the drawings. Dry isobutane containing a small proportion of dissolved hydrogen fluoride is withdrawn from the top of the drying tower and is passed to an alkylator. In the alkylator, it is agitated with about seventy-five per cent of its weight of substantially pure anhydrous liquid hydrofluoric acid, and then to it is added said liquefied butene-containing refinery gas, introduced through small jets at several spaced points. The reaction conditions are about 50° F., 100 lb. per sq. in. gauge, and thorough agitation during the entire reaction period of about thirty minutes.

After this period, the alkylation mixture passes to a separator wherein it is cooled to 10° F. and is allowed to settle. The resulting upper or hydrocarbon layer is charged to a fractional-distillation column, and is distilled. A fraction comprising light or difficultly condensable hydrocarbons is withdrawn overhead; an azeotropic mixture of isobutane and hydrogen fluoride is passed to a second separator; a fraction comprising substantially pure isobutane is recycled to the alkylator; a fraction comprising normal butane is withdrawn; a motor-fuel fraction comprising chiefly octanes but including also pentanes, hexanes, heptanes, and heavier hydrocarbons, including dodecane, is passed to storage or to equipment for subsequent processing; and a fraction comprising heavy polymers, oil, etc., is withdrawn and disposed of as may appear desirable.

The layers of used acid from the bottoms of the drying tower and the first-mentioned separator are passed to a second fractionator, in which such material is fractionally distilled. An overhead fraction comprising an azeotropic mixture of hydrogen fluoride and isobutane is recycled to the second separator; a relatively large fraction of substantially pure anhydrous hydrogen fluoride is recycled partly to the drying tower and partly to the alkylation unit; and a bottom fraction comprising water, hydrogen fluoride, and relatively heavy acid-soluble compounds is withdrawn. In the second separator, the azeotropic mixture from the two aforementioned fractionators are combined and cooled, forming a hydrocarbon layer which is recycled to the alkylator, and an acid layer which is recycled partly to the drying tower and partly to the alkylator.

The motor fuel fraction produced is dry and free of hydrogen fluoride. It contains large proportions of high-octane hydrocarbons boiling in the gasoline range and is especially suitable for use as a base for aviation-grade gasoline, being in general superior to the product formed under such conditions that an appreciable concentration of water is present in the catalyst.

The above examples are intended only to illustrate some aspects of the invention and the specific conditions and the apparatus described are not intended to limit the scope of the invention.

This invention is obviously applicable, with such slight modifications as will occur to those skilled in the art, to processes using catalysts other than pure hydrogen fluoride; a typical process is that of alkylation of isoparaffins with ethylene in the presence of a mixture of boron trifluoride and hydrogen fluoride. In general, the drying step may be advantageously combined, without freeing the dried hydrocarbon from residual or dissolved hydrofluoric acid, with any process in which a completely dry saturated hydrocarbon material is desirable as a reactant and in which a small residual proportion of hydrogen fluoride has a negligible or, as in an alkylation process, an advantageous effect.

This invention removes water from substantially saturated hydrocarbon material by contacting it with a drying agent comprising concentrated hydrofluoric acid, and provides for the recovering of this drying agent. Further, this invention advantageously combines the drying operation with hydrocarbon-conversion processes in which hydrofluoric acid has a beneficial catalytic effect. The combination is made in such a manner as to eliminate a step, which would be otherwise ordinarily required for the removal of residual hydrofluoric acid from the dried hydrocarbon material before passing it to the catalytic conversion step; further it provides advantageously for the recovery in one acid-recovery system of spent acid from the drying step and of spent acid from the conversion step, thus simplifying the over-all process and reducing the required amount of equipment.

Because the invention may be practiced otherwise than as specifically described or illustrated, and because many modifications and variations within the spirit and scope of it will be obivous to those skilled in the art, the invention should not be unduly restricted by the foregoing specification and illustrative examples.

I claim:

1. A process for alkylating a low-boiling isoparaffin in the presence of concentrated hydrofluoric acid, which comprises contacting in a dehydrating zone a liquid low-boiling isoparaffin containing dissolved water with liquid hydrofluoric acid separated from a subsequent alkylation step to remove water from said isoparaffin, separating resulting dehydrated isoparaffin and liquid hydrofluoric acid, passing said dehydrated isoparaffin to an alkylation step and contacting same therein under alkylation conditions with an alkylating reactant and liquid hydrofluoric acid, passing effluents of said alkylation to a first separating zone, removing from said separating zone a hydrocarbon phase and a liquid hydrofluoric acid phase, passing a portion of said acid phase to said alkylation step, passing a further portion of said acid phase to said dehydrating zone, passing said hydrocarbon phase to a first fractional distillation means, passing from said means a low-boiling fraction comprising hydrofluoric acid associated with said hydrocarbon phase together with a sufficient amount of a low-boiling paraffin to form an azeotropic mixture therewith, passing said low-boiling fraction to a second separating zone and effecting therein a separation between a liquid hydrocarbon phase and a liquid hydrofluoric acid phase, passing a hydrofluoric acid phase from said second separating zone to said alkylation step, removing from said first fractional distillation means a hydrocarbon fraction comprising hydrocarbons produced by said alkylation and essentially free from said hydrofluoric acid as a product of the process, passing liquid hydrofluoric acid from said dehydrating zone to a second fractional distillation means, removing from said fractional distillation means a low-boiling fraction comprising hydrofluoric acid and a low-boiling paraffin, and passing said low-boiling fraction to said second separating zone.

2. A process for alkylating a low-boiling isoparaffin in the presence of concentrated hydrofluoric acid, which comprises contacting in a dehydrating zone a liquid low-boiling isoparaffin containing dissolved water with liquid hydrofluoric acid separated from a subsequent alkylation step to remove water from said isoparaffin, separating resulting dehydrated isoparaffin and liquid hydrofluoric acid, passing said dehydrated isoparaffin to an alkylation step and contacting same therein under alkylation conditions with an alkylating reactant and liquid hydrofluoric acid, passing effluents of said alkylation to a separating zone, removing from said separating zone a hydrocarbon fraction and recovering an alkylate therefrom, removing also from said separating zone a liquid hydrofluoric acid fraction, passing a portion of said liquid hydrofluoric acid fraction to said alkylation step, passing a further portion of said liquid hydrofluoric acid fraction to said dehydrating zone, passing liquid hydrofluoric acid from said dehydrating zone to a fractional distillation, removing from said fractional distillation a low-boiling fraction comprising hydrofluoric acid and a low-boiling paraffin, passing said fraction to a second separating zone and separating therefrom a liquid hydrofluoric acid phase, and passing the last said hydrofluoric acid to said alkylation step.

3. A process for alkylating hydrocarbons in the presence of concentrated hydrofluoric acid, which comprises contacting in a dehydrating zone a low-boiling alkylatable hydrocarbon material associated with a minor amount of water with liquid hydrofluoric acid, effluent from an alkylation step as subsequently recited, to remove water from said hydrocarbon material, separating said hydrocarbon material and said liquid hydrofluoric acid, passing said hydrocarbon material to an alkylation step and contacting same therein under alkylation conditions with an alkylating reactant in the presence of an alkylating catalyst comprising concentrated hydrofluoric acid, passing effluents of said alkylation to a separating zone, removing from said separating zone a hydrocarbon phase and recovering therefrom alkylated hydrocarbons, removing also from said separating zone a liquid hydrofluoric acid phase and passing at least a portion thereof to said dehydrating zone, passing liquid hydrofluoric acid from said dehydrating zone to fractionating means, recovering from said fractionating means purified substantially anhydrous hydrofluoric acid, and passing said anhydrous hydrofluoric acid to said alkylation step.

4. A process for dehydrating a hydrocarbon material comprising a paraffin having three to five carbon atoms per molecule and which is associated with a minor amount of water, which comprises intimately contacting in a dehydrating zone such a hydrocarbon material with liquid concentrated hydrofluoric acid, separating the resultant mixture into a hydrocarbon phase and a liquid hydrofluoric acid phase, passing said hydrocarbon phase to a first fractional distillation means, passing from said means a low-boiling fraction comprising hydrofluoric acid associated with said hydrocarbon phase together with a sufficient amount of said paraffin of three to five carbon atoms per molecule to form an azeotropic mixture therewith, passing said low-boiling fraction to a separating zone and effecting therein a separation between a liquid hydrocarbon phase and a liquid hydrofluoric acid phase, passing a hydrocarbon phase from said separating zone to said first fractional distillation means, removing from said first fractional distillation means a hydrocarbon material essentially free from water and hydrofluoric acid as a product of the process, passing said liquid hydrofluoric acid phase from said dehydrating zone to a second fractional distillation means, separating from said second means an overhead fraction comprising hydrocarbon dissolved in said liquid hydrofluoric acid together with sufficient hydrofluoric acid to form an azeotropic mixture therewith, passing said fraction to said separating zone and effecting therein a separation between a liquid hydrocarbon phase and a liquid hydrofluoric acid phase, and removing from said separating zone said liquid hydrofluoric acid phase and passing same to said dehydrating zone.

5. A process for dehydrating a hydrocarbon material comprising a paraffin having three to five carbon atoms per molecule and which is associated with a minor amount of water, which comprises intimately contacting in a dehydrating zone such a hydrocarbon material with liquid concentrated hydrofluoric acid, separating the resultant mixture into a hydrocarbon phase and a liquid hydrofluoric acid phase, passing to a first fractional distillation means a hydrocarbon material comprising hydrocarbons from said hydrocarbon phase and hydrofluoric acid associated therewith, passing from said means a low-boiling fraction comprising hydrofluoric acid associated with said hydrocarbon phase together with a sufficent amount of said paraffin of three to five carbon atoms per molecule to form an azeotropic mixture therewith, passing said low-boiling fraction to a separating zone and effecting therein a separation between a liquid hydrocarbon phase and a liquid hydrofluoric acid phase, passing a hydrocarbon phase from said separating zone to said first fractional distillation means, removing from said first fractional distillation means a hydrocarbon material essentially free from water and hydrofluoric acid as a product of the process, passing said liquid hydrofluoric acid phase from said dehydrating zone to a second fractional distillation means, separating from said second means an overhead fraction comprising hydrocarbon dissolved in said liquid hydrofluoric acid together with sufficient hydrofluoric acid to form an azeotropic mixture therewith, passing said fraction to said separating zone, and removing from said separating zone said liquid hydrofluoric acid phase and passing same to said dehydrating zone.

6. An improved process which comprises subjecting a liquid hydrocarbon material, containing a paraffin hydrocarbon having three to five carbon atoms per molecule and dissolved hydrogen fluoride and substantially free from water, to a first fractional distillation to produce a low-boiling fraction comprising all said dissolved hydrogen fluoride and a sufficient amount of said paraffin to form an azeotropic mixture therewith and a high-boiling hydrocarbon fraction free from hydrogen fluoride, passing said low-boiling fraction to a separating zone and separating therefrom a hydrogen fluoride phase; intimately contacting in a dehydrating zone a hydrocarbon material, comprising a paraffin hydrocarbon having three to five carbon atoms per molecule and which is associated with a minor amount of water, with said hydrogen fluoride phase in liquid form, separating from the resultant mixture in said dehydrating zone a hydrocarbon phase and a liquid hydrogen fluoride phase, subjecting said liquid hydrogen fluoride phase to a second fractional distillation to produce a low-boiling fraction comprising hydrocarbon dissolved in said liquid hydrogen fluoride together with at least sufficient hydrogen fluoride to form an azeotropic mixture therewith, passing said fraction to the aforesaid separating zone, and passing to said first fractional distillation a liquid hydrocarbon material containing dissolved hydrogen fluoride and comprising hydrocarbons from said hydrocarbon phase separated from said dehydrating zone as at least a portion of the hydrocarbon material subjected to said distillation.

FREDERICK E. FREY.